United States Patent
Kageyama et al.

(10) Patent No.: US 7,280,282 B2
(45) Date of Patent: Oct. 9, 2007

(54) DISPLAY APPARATUS FOR VEHICLE

(75) Inventors: Hideaki Kageyama, Shizuoka (JP); Go Nakamura, Shizuoka (JP); Yoshiyuki Furuya, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 11/369,837

(22) Filed: Mar. 8, 2006

(65) Prior Publication Data
US 2006/0203351 A1    Sep. 14, 2006

(30) Foreign Application Priority Data
Mar. 9, 2005  (JP) .............................. 2005-065854
Mar. 9, 2005  (JP) .............................. 2005-065855

(51) Int. Cl.
*G02B 27/10*  (2006.01)
(52) U.S. Cl. ...................................... 359/632; 359/630
(58) Field of Classification Search ................. 359/632
See application file for complete search history.

(56) References Cited

U.S. PATENT DOCUMENTS

| | | | | |
|---|---|---|---|---|
| 5,237,455 A | * | 8/1993 | Bordo et al. ................. | 359/632 |
| 5,677,701 A | * | 10/1997 | Okuyama et al. ............... | 345/7 |
| 6,049,288 A | * | 4/2000 | Kawasaki ................. | 340/815.4 |
| 6,654,177 B2 | * | 11/2003 | Nakamura et al. ........... | 359/632 |
| 2005/0024490 A1 | * | 2/2005 | Harada et al. ............... | 348/115 |
| 2005/0156815 A1 | * | 7/2005 | Aoki et al. ..................... | 345/7 |

FOREIGN PATENT DOCUMENTS

| | | |
|---|---|---|
| JP | 9-315182 | 12/1997 |
| JP | 2003-39981 | 2/2003 |
| JP | 2004-196228 | 7/2004 |
| JP | 2004196228 A  * | 7/2004 |

* cited by examiner

*Primary Examiner*—Jordan Schwartz
*Assistant Examiner*—James C. Jones
(74) *Attorney, Agent, or Firm*—Kratz, Quintos & Hanson, LLP

(57) ABSTRACT

In a head-up display apparatus for a vehicle, an aspherical surface of a reflection mirror compensates a distorted projected image caused by non-planarity of a windshield at a predetermined projection area thereon. When moving an eye point of a vehicle driver, an adjustment mechanism moves a stopper pushing the reflection mirror to adjust a reflecting angle so that the reflection mirror reflects light beams to the projection area and the projection area reflects the light beams toward the eye range. During the angle adjustment, an urging member and the stopper hold the reflection mirror.

4 Claims, 7 Drawing Sheets

DISPLAY APPARATUS FOR VEHICLE

CROSS REFERENCE TO RELATED APPLICATIONS

This application is based on Japanese Patent Applications No. 2005-065854 and No. 2005-065855 filed in Japan Patent Office, the contents of which are hereby incorporated by reference.

BACKGROUND OF THE INVENTION

1. Field of the Invention

The present invention relates to a display apparatus for a vehicle, in particular, a head-up display apparatus having a reflection mirror for allowing a vehicle driver to see both a forward view through a windshield and a reflected image projected from a display source superimposed thereon, and the head-up display apparatus having a reflection mirror formed for compensating a distortion of the displayed image caused by non-planarity of the windshield.

2. Description of the Related Art

Nowadays, a projector referred to as a head-up display apparatus (HUD) is installed in some vehicles for improving visibility of a vehicle driver.

FIG. 4A shows a schematic view for explaining reflections of light beams at a windshield 3 and at an aspherical mirror 4 projected toward a center of an eye range IR (view point). FIG. 4B shows reflecting points on a reflecting surface of the aspherical mirror.

As shown in FIG. 4A, a conventional HUD includes: a reflection mirror 4 disposed under an instrument panel 1 of a vehicle; and a display source 5 such as a Field Emission Display, an Electroluminescent Display, or an Liquid Crystal Display with backlighting. An image displayed on the display source 5 is reflected by the reflection mirror 4, projected on a projection area E of the windshield 3 through an opening (not shown) on the instrument panel 1. The projected image is superimposed on a forward view through the windshield.

The eye range IR includes an eye point IU corresponding to an upper limit of the eye range IR, an eye point IL corresponding to a lower limit of the eye range, and an eye point IM disposed on a middle of the eye range IR. An aspherical mirror is often used as the reflecting mirror 4 for compensating a distortion caused by non-planarity of the windshield 3.

As shown in FIGS. 4A and 4B, the reflecting surface of the reflecting mirror 4 is so designed as to compensate the image reflected on reflecting points A1, B1, C1 positioned on the reflecting mirror 4 corresponding to projecting points A0, B0, C0 positioned on the windshield 3. The reflecting points A1, B1, C1 correspond to an upper, a middle, and a lower parts of the display source 5 respectively.

The head-up display apparatus includes an image adjustment mechanism to the eye range. The image is so adjusted that an angle of depression from the eye point is constant throughout the adjustment.

An applicant of the present invention discloses a head-up display apparatus for adjusting the image to the eye point precisely in Japanese Published Patent Application No. 2003-39981.

A large sized head-up display apparatus is used for a night vision or the like. Usually, such a large-sized head-up display apparatus is retractable. A foldable reflecting mirror is disclosed in Japanese Published Patent Application No. H09-315182.

Further, Japanese Published Patent Application No. 2004-196228 discloses a head-up display apparatus having a quickly openable and closable reflection mirror, a reflection angle of which is easily adjustable.

However, there is a problem that the head-up display apparatus having an angle adjustment mechanism is large-sized because the reflection mirror and the display source should be movable.

Further, as shown in FIGS. 5A to 5C, when a cross point of optical axes toward the eye points of the eye range is designed to be positioned in the vicinity of the reflecting surface, the projecting points on the windshield are separated. Therefore, it is difficult to compensate the distortion.

As shown in FIGS. 5A to 5C, with a reflection mirror 4 rotated about a rotating shaft 121 disposed at the vertical center thereof, when the cross point of optical axes LU, LM, LL respectively corresponding to eye points IU, IM, IL of the eye range is positioned in the vicinity of the center of a reflecting surface 4a of the reflection mirror 4, reflecting points D2, E2, F2 on the reflecting surface 4a are concentrated at the same position, however, projecting points D0, E0, F0 on the windshield 3 are separated from each other.

Accordingly, since the projecting points are moved by the adjustment of the eye range IR, the distortion of the image caused by the non-planarity of the windshield 3 is hard to be compensated even with the aspherical mirror 4.

The head-up display apparatus disclosed in the Japanese Published Patent Application No. 2004-196228 is also large-sized because the angle adjustment needs a widely opened reflection mirror. That is because a mechanism for opening and closing the reflection mirror is cooperated with the angle adjustment mechanism, and the angle adjustment mechanism cannot work until the mirror is opened at a specific angle.

There is another problem in the head-up display apparatus having a stopper 141 used for fine adjustment of the reflection mirror. As shown in FIGS. 8A and 8B, the head-up display apparatus includes the reflection mirror 4, a rotating shaft 6 rotated with the reflection mirror 4, a conventional angle adjustment mechanism for rotating the rotating shaft 6, and the stopper 141 for fine adjustment of an angle of the reflection mirror 4.

The stopper 141 cannot be moved together with the reflection mirror 4. Accordingly, when finely adjusting the reflection mirror 4, firstly, the angle adjustment mechanism rotates the reflection mirror 4 in a direction X, then, the stopper 141 is moved in a direction Z, and then the angle adjustment mechanism rotates the reflection mirror 4 in a direction Y to bring the reflection mirror 4 into contact with the stopper 141. Thus, a reciprocating motion of the reflection mirror 4 is needed for the fine adjustment thereof.

Accordingly, an object of the present invention is to provide a small-sized head-up display apparatus that projects an image without distortion, and allows a position of the image and an angle of a reflection mirror to be easily adjusted.

SUMMARY OF THE INVENTION

In order to attain the object, according to the present invention, there is provided a head-up display apparatus including: a reflection mirror having an aspherical surface for compensating a distortion of a projected image caused by a non-planarity of a windshield; and a driving device for driving the reflection mirror to adjust projected light reflected at a reflecting point on the reflection mirror to a predetermined projecting point in a predetermined projection area on the windshield, said driving device being moved for pushing the reflection mirror to adjust the projected light reflected at the projection point to an eye point, from which a vehicle driver can see a forward view through the windshield and the projected image superimposed on the forward view.

Preferably, the driving device rotates the reflection mirror about a rotating shaft disposed separately from the reflection mirror and facing a reflecting surface thereof.

More preferably, the reflection mirror is retractable, and the driving device includes: a rotatable frame supporting the reflection mirror, and being rotatable together with the reflection mirror between positions where the reflecting mirror being arranged substantially vertically and horizontally; a stopper for stopping the rotation of the reflection mirror at a predetermined angle; and an adjusting member for moving the stopper for pushing the reflection mirror to adjust the angle of the reflection mirror. Further preferably, the driving device further includes an urging member constantly urging the reflection mirror in a direction of arranging the reflection mirror vertically for holding the rotating mirror with the stopper pushing in the direction of arranging the reflection mirror horizontally.

Further preferably, the frame supports the reflection mirror in a manner that at least an upper part of the reflection mirror is temporarily projected outward from an instrument panel of the vehicle during retraction of the reflection mirror, and the stopper stops the rotation of the reflection mirror so as not to be seen from the eye range through an opening of the instrument panel when the head-up display apparatus is in use.

These and other objects, features, and advantages of the present invention will become more apparent upon reading of the following detailed description along with the accompanied drawings.

DETAILED DESCRIPTION OF THE PREFERRED EMBODIMENT

First Embodiment

Figure 1A:
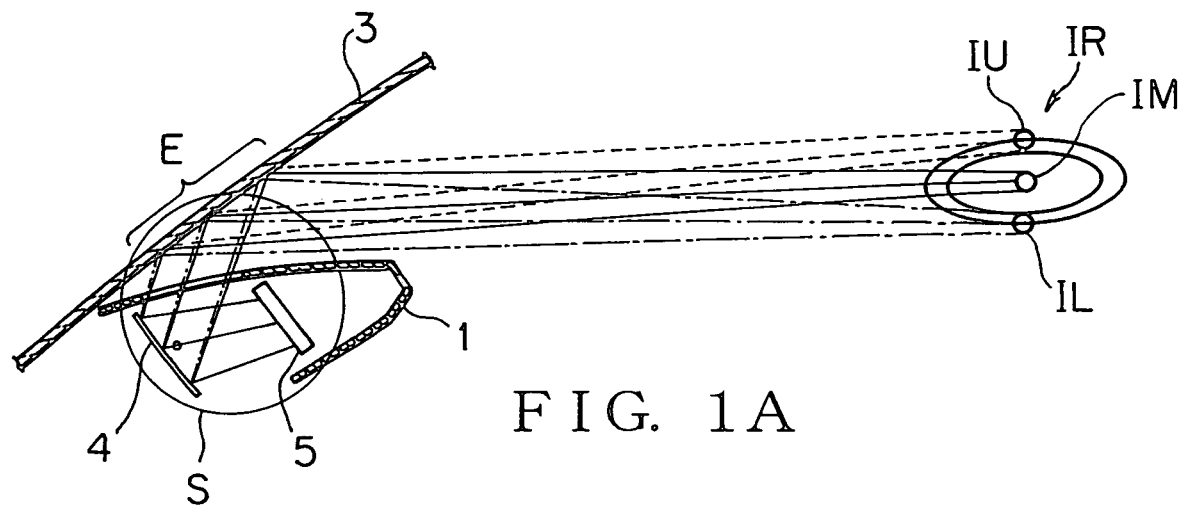
FIG. 1A is a schematic sectional view showing a head-up display apparatus for a vehicle according to the present invention.

A first embodiment of a head-up display apparatus 10 for a vehicle will be explained with reference to FIGS. 1A to 3. In order to avoid repetitions, the same reference numerals are used for the same components, and only the differences existing in comparison with the related art described above will be explained.

As shown in FIGS. 1A to 3, a reflection mirror 4 reflects a projected image from a display source 5 to a predetermined projection area E on a windshield 3 of a vehicle. A vehicle driver can see the projected image superimposed on a forward view through eye points IU, IM, IL. The reflection mirror 4 is formed in a manner to compensate a distortion of the projected image caused by non-planarity of the windshield 3. The head-up display apparatus 10 further includes a driving device 6, 14. The driving device 6, 14 so moves the reflection mirror 4 that the mirror 4 respectively reflects beams of the projected image at reflecting points D1, E1, F1 to reflecting points D0, E0, F0 on the predetermined projection area E on the windshield 3. Further, the driving device 6, 14 is moved for adjusting the reflection mirror 4 in a manner that the reflection mirror 4 reflects the projected beams toward the eye points IU, IM, IL.

In detail, the driving device 6, 14 rotates the reflection mirror 4 about a rotating shaft 6 disposed separately from the reflection mirror 4 and facing a reflecting surface thereof. For determining a position of the rotating shaft 6, firstly, various positions on the reflection mirror 4, where the projected beams are reflected at the reflecting points D1, E1, F1 to the reflecting position D0, E0, F0 in the projection area E are determined by such as simulation, or experiment. Then, the position of the rotating shaft 6 is determined so that the reflection mirror 4 traces the determined positions forming a predetermined route.

The head-up display apparatus 10 according to the present invention includes: a case body 11 having an upper opening; the display source 5 disposed at the center of the case body 11; and the reflection mirror 4 facing the display source 5. A cover 41 is attached to an upper wall opposite to the reflecting surface of the reflection mirror 4. A pair of legs 42 extending from the cover 41 toward the reflecting surface of the reflection mirror 4 is rotatably attached to the rotating shaft 6.

Incidentally, in the first embodiment, the head-up display apparatus 10 includes a mirror unit 42, 4 having the cover 4 and the legs 42 extending therefrom. However, according to the present invention, the legs 42 may extend from the reflection mirror 4.

A substantially U-shaped frame 7 is fixed to the rotating shaft 6 to be rotated theretogether. When the frame 7 comes in contact with a frame stopper 13 disposed on the case body 11, the rotating shaft 6 stops rotating in a direction Y of rotating the reflection mirror 4 to reflect the projected image toward the windshield 3. Thus, the frame stopper 13 regulates the rotation of the frame 7 and the rotating shaft 6 in the direction Y. In addition, the frame 7 fixed to the rotating shaft 6 rotates the mirror unit 42, 4 through a later described urging member 8.

A gear 121 is fixed to one side of the rotating shaft 6. Output from a motor 122 is transferred to the gear 121 via a group of gears 123. A not-shown controller controls the motor output to rotate the rotating shaft 6 in a direction of the output of the motor 123. Thus, a rotating mechanism 12 including the gear 121, the motor 122, and the gears 123 for rotating the mirror unit 42, 4 to arrange the mirror unit 42, 4 vertically and horizontally relatively to the instrument panel 1 of a vehicle is mounted on the first embodiment of the head-up display apparatus 10. However, if the retractable mirror is not used for the head-up display apparatus 10, the rotating mechanism 12 may be canceled.

Figure 3:
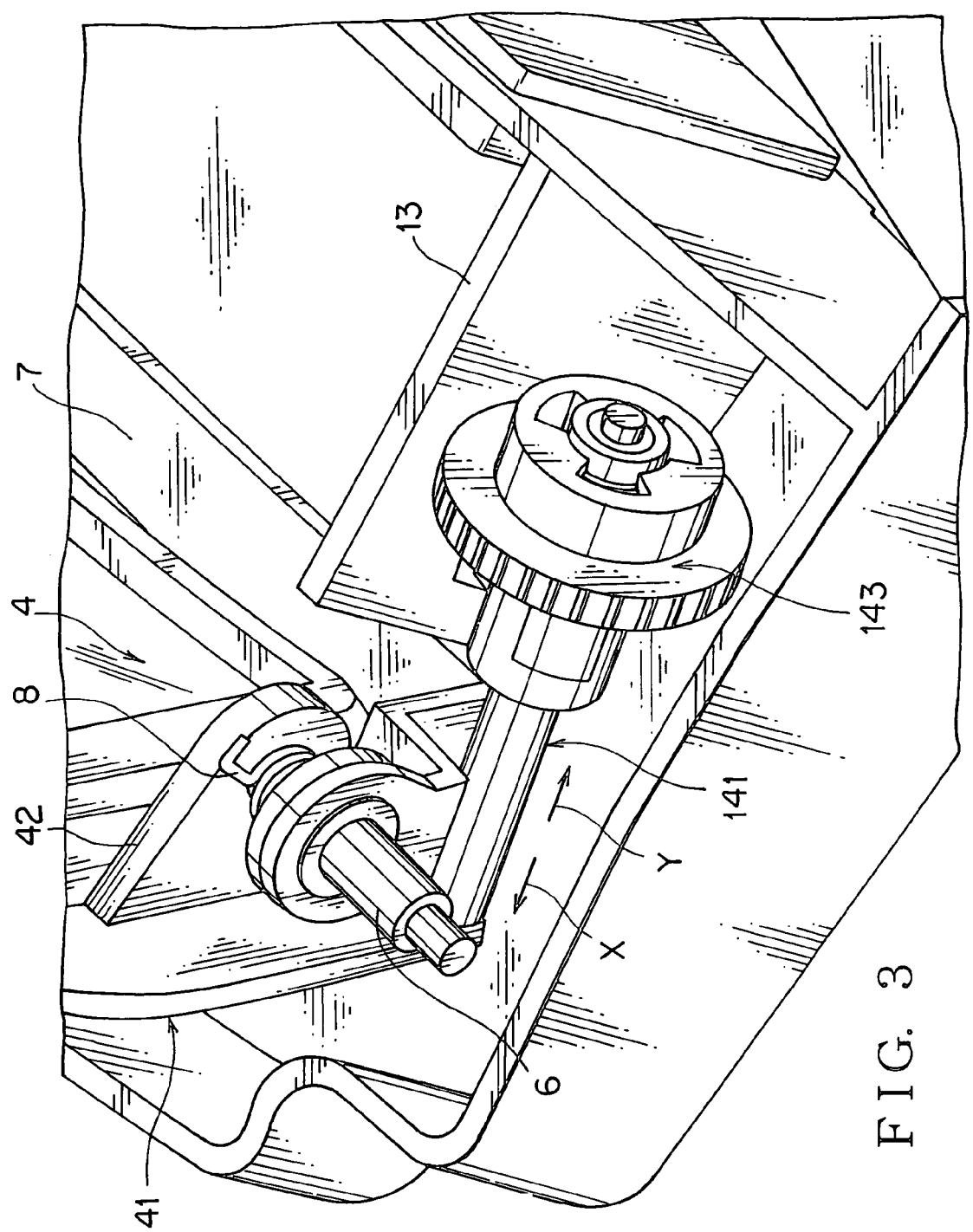
FIG. 3 is an enlarged explanatory view showing operations of the reflecting mirror and a stopper of FIG. 2.
Figure 4A:
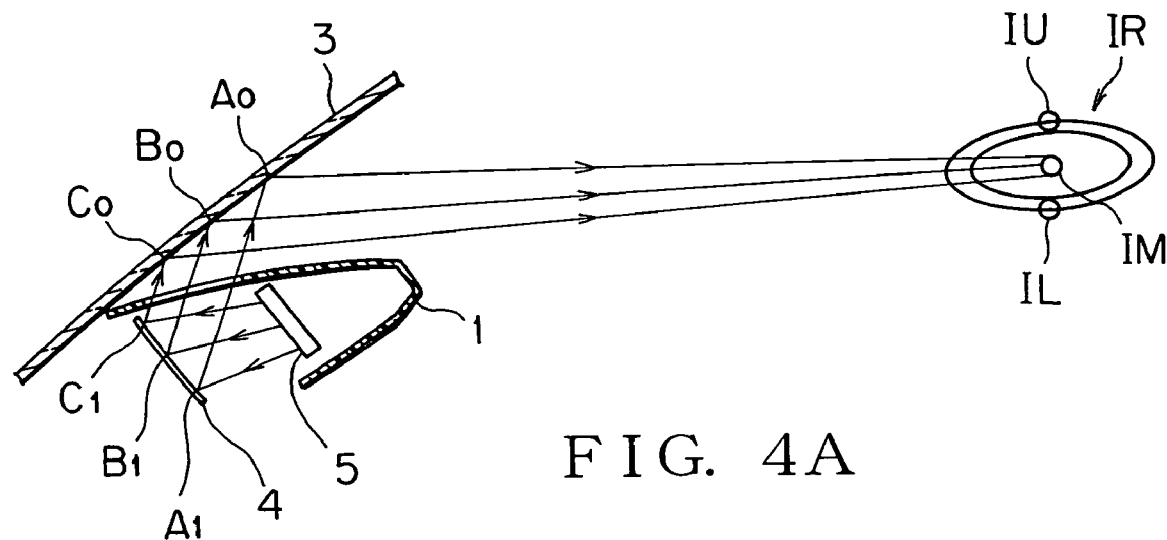
FIG. 4A is a schematic sectional view showing reflecting points on an aspherical mirror of light beams projected toward an eye range on a windshield and according to the present invention.
Figure 4B:
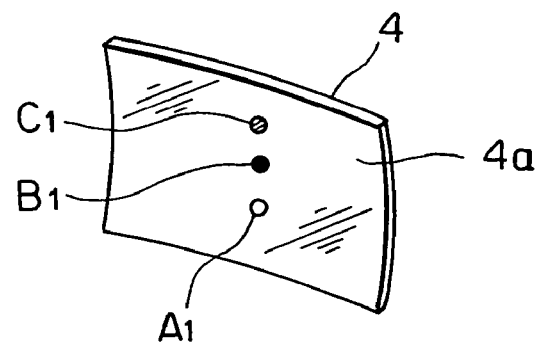
FIG. 4B is a perspective view showing reflecting points on a reflecting surface of the aspherical mirror according to the present invention.
Figure 5A:
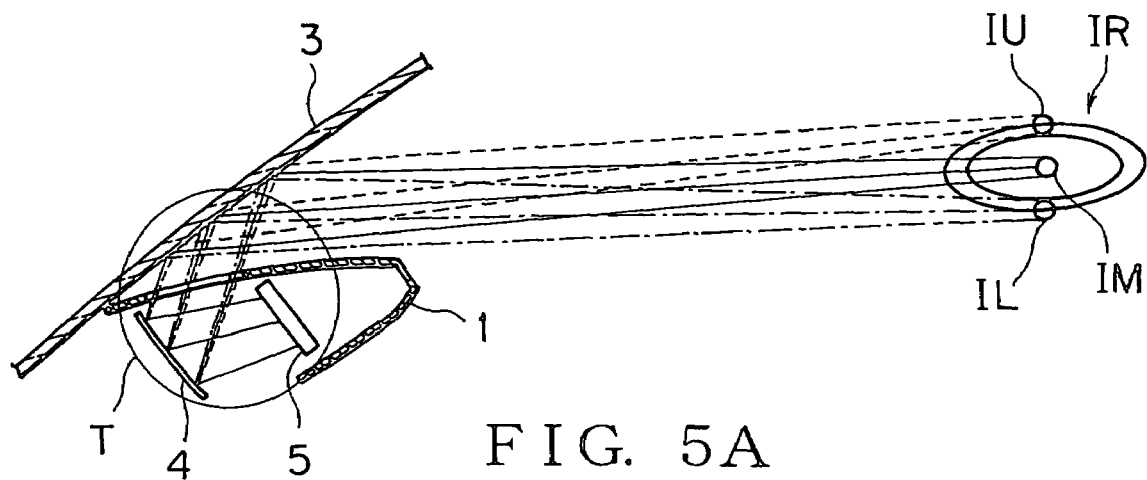
FIG. 5A is a schematic sectional view showing reflecting points corresponding to optical axes of eye points on the eye range according to the present invention.
Figure 5B:
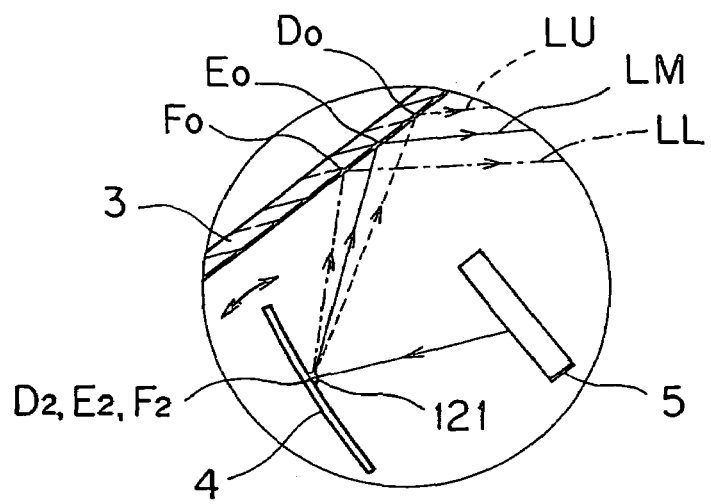
FIG. 5B is an enlarged view showing an item T of FIG. 5A.
Figure 5C:
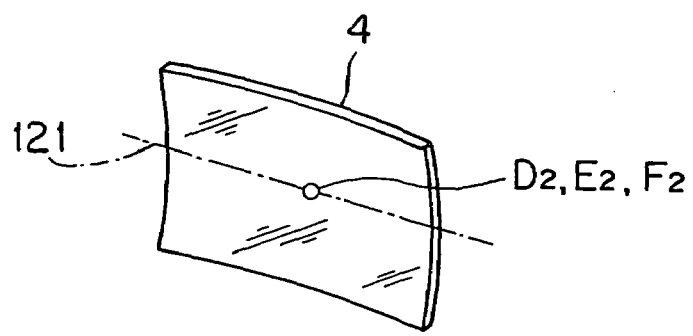
FIG. 5C is a perspective view showing reflecting points on the reflecting surface of the reflection mirror of FIG. 5A.

A stopper mechanism 14 is mounted on the other side of the rotating shaft 6 in the case body 11. The stopper mechanism 14 regulates the reflection angle and the position of the reflection mirror 4 of the mirror unit 42, 4. As shown in FIG. 3, the stopper mechanism 14 includes a stopper 141 for stopping the rotation of the mirror unit 42, 4 rotated by the frame 7 in the direction Y at a predetermined reflection angle.

The stopper mechanism 14 further includes: a stopper motor 142 for moving the stopper 141 in directions X or Y of FIG. 3; and a transmission gear 143 for transmitting output of the stopper motor 142 to the stopper 141. The not-shown controller previously associates the positions of the stopper 141 with the reflection angles of the reflection mirror 4 and stores the reflection angles as adjusting angles. Therefore, the controller is able to set the reflection mirror 4 at one of the adjusting angles with the stopper 141.

The urging member 8 such as a tension spring is disposed in between the frame 7 and the legs 42 of the mirror unit 42, 4, and constantly urges the mirror unit 42, 4 in the direction Y. Owing to the urging member 8, the stopper mechanism 14 is able to adjust the mirror unit 42, 4 with no effect of the rotation of the frame 7. Further, the urging member 8 urging the mirror unit 42, 4 to the rotating shaft 6 prevents the mirror unit 42, 4 from shaking caused by vibration of a vehicle or the like.

When the stopper 141 is moved in the direction X, the stopper 141 pushes to rotate the mirror unit 42, 4 about the rotating shaft 6 in the direction X. When the stopper 141 is moved in the direction Y, the urging member 8 pushes to rotate the mirror unit 42, 4 about the rotating shaft 6 in the direction Y. Thus, moving the stopper 141 controls the position of the mirror unit 42, 4. Further, the mirror unit 41, 4 can be employed for various shapes of the windshields 3 by adjusting the length of the legs 42 corresponding to the predetermined route of the reflection mirror 4.

Thus, the driving device 6, 14 for rotating and adjusting the reflection mirror 4 includes the rotating shaft 6 and the stopper mechanism 14.

Incidentally, in the first embodiment, the reflection mirror 4 is rotated about the rotating shaft 6. However, the present invention is not limited to the above. If the reflection mirror 4 cannot trace the predetermined route owing to the shape of the windshield 3, a mounting position of the head-up display apparatus 10 in a vehicle or the like, other mechanism such as a sliding mechanism may move the reflection mirror 4.

Next, an example of an angle adjustment operation of the reflection mirror 4 according to the above-described head-up display apparatus 10 will be described.

Firstly, the rotating mechanism 12 rotates the frame 7 in the direction Y to bring the frame 7 into contact with the frame stopper 13 and to arrange the mirror unit 42, 4 vertically. At this time, the mirror unit 42, 4 rotated with the frame 7 is stopped by the stopper 141 of the stopper mechanism 14. Thus, the stopper 141 sets the reflection mirror 4 at the predetermined angle.

Figure 1B:
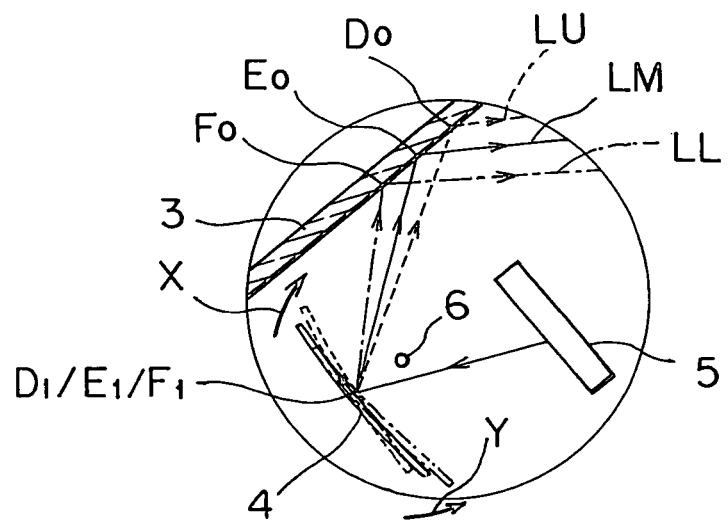
FIG. 1B is an enlarged view showing an item S of FIG. 1A.
Figure 1C:
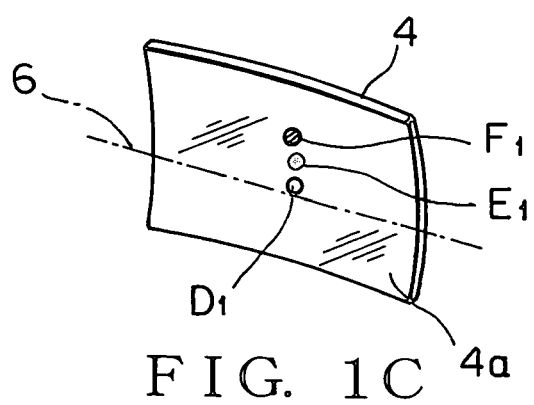
FIG. 1C is a perspective view showing reflecting points on a reflecting surface of a reflection mirror of FIG. 1B.
Figure 2:
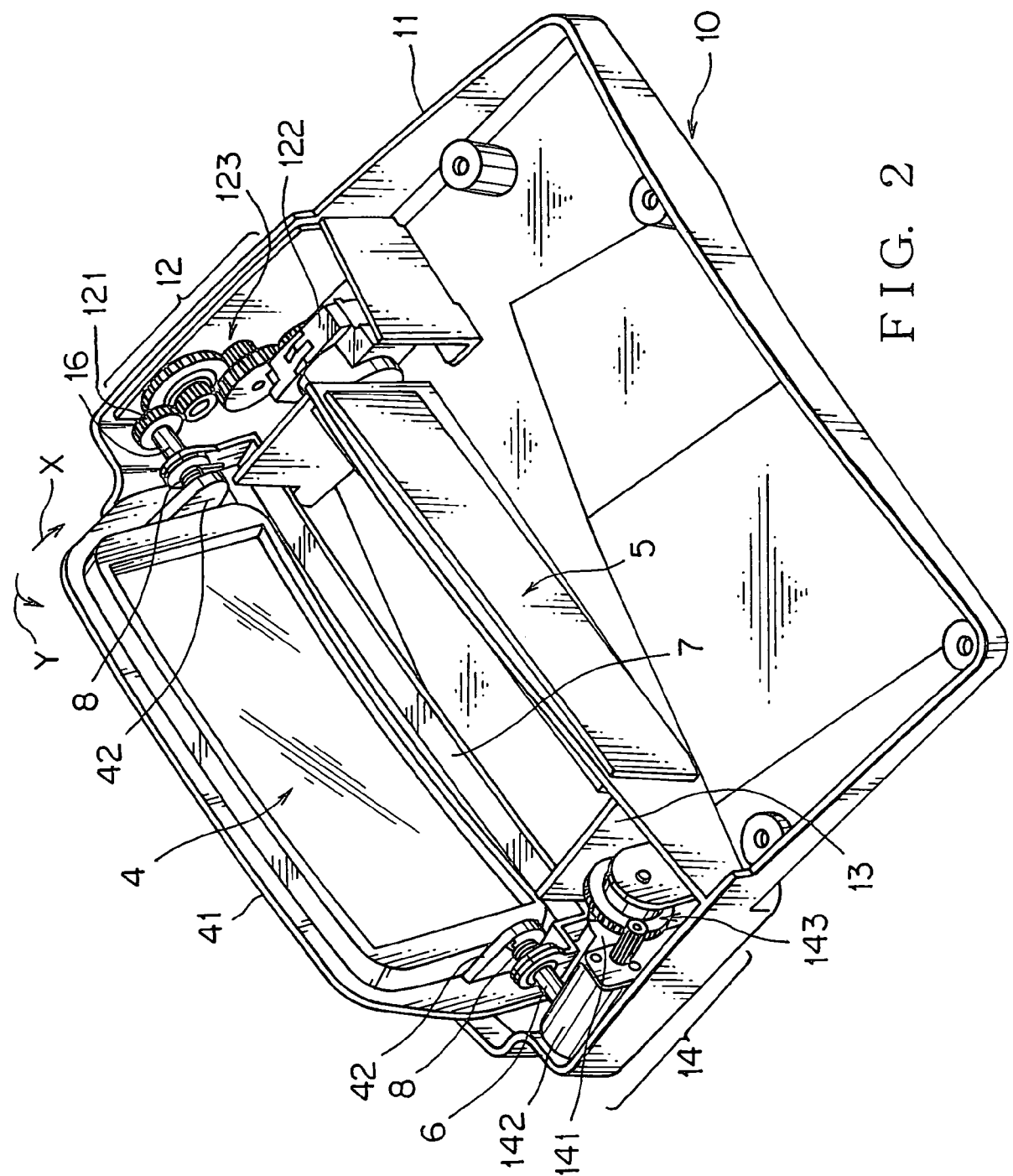
FIG. 2 is a perspective view showing the head-up display apparatus of FIG. 1A.

As shown in FIG. 1B, when a driver is changed and the eye point IM is to be changed to the eye point IU, a not-shown switch slides the stopper 141 in the direction X to rotate the reflection mirror 4 in the direction X about the rotating shaft 6.

If the reflection mirror 4 is rotated to the position where the light beam LU from the display source 5 is reflected at the projecting point D1 on the reflecting surface 4a of the reflection mirror 4, and then reflected at the projecting point D0 on the projection area E, the distortion of the projected image on the projection area E is prevented. Accordingly, the switching operation to surely set the reflection mirror 4 at the position described above can surely compensate the distortion of the projected image on the projection area E viewed from the eye point IU.

When a driver is changed and the eye point IM is to be changed to the eye point IL, the not-shown switch slides the stopper 141 in the direction Y, and the urging member 8 rotates the reflection mirror 4 in the direction Y about the rotating shaft 6.

If the reflection mirror 4 is rotated to the position where the light beam LL from the display source 5 is reflected at the projecting point F1 on the reflecting surface 4a of the reflection mirror 4, and then reflected at the projecting point F0 on the projection area E, the distortion of the projected image on the projection area E is prevented. Accordingly, the switching operation to surely position the reflection mirror 4 at the position described above can surely compensate the distortion of the projected image on the projection area E viewed from the eye point IL.

According to the present invention described above, the reflection angle of the reflection mirror 4 is so adjusted that the correspondence between the projecting points D0, E0, F0 on the projection area E and the reflecting points D1, E1, F1 is the same. Accordingly, the aspherical reflection mirror 4 surely compensate the distortion of the projected image caused by the non-planarity of the windshield 3 even when the eye point is changed. Therefore, a design for preventing distortion of the head-up display apparatus 10 can be made more easily than that of the conventional head-up display apparatus without enlarging a size of a vehicle.

Further, because the reflection mirror 4 is rotated about the rotating shaft 6 disposed separately from the reflection mirror 4, a moving range of the reflection mirror 4 is larger than a conventional reflection mirror formed integrally with a rotating shaft at a backside thereof. Therefore, the design for preventing distortion can be made further easily.

Incidentally, in the first embodiment, only a design using the light beams LU, LM, LL corresponding to the eye points IU, IM, IL is explained, however, various designing method can be used according to the present invention.

Figure 6A:
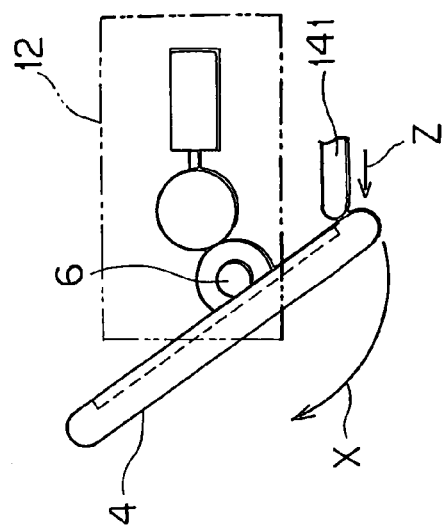
FIG. 6A is a schematic view showing the reflection mirror of the head-up display apparatus in use with an instrument panel of a vehicle.
Figure 8A:
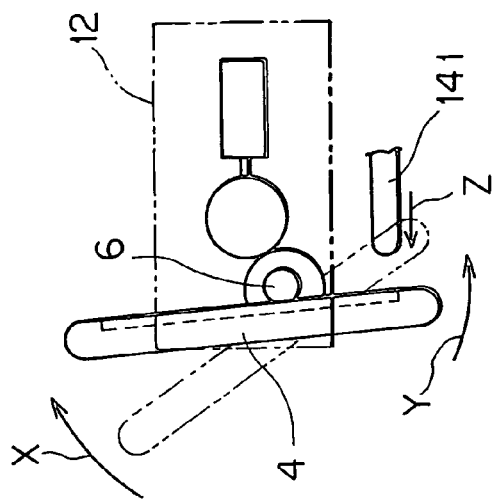
FIGS. 8A and 8B are explanatory views showing problems on an angle adjustment of the reflection mirror according to a conventional head-up display apparatus.
Figure 6B:
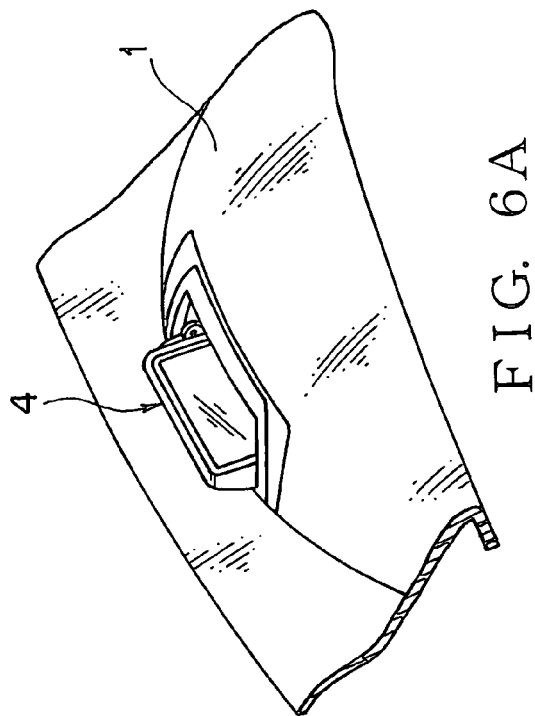
FIG. 6B is a schematic view showing the reflection mirror of the head-up display apparatus not in use with the instrument panel of the vehicle.
Figure 8B:
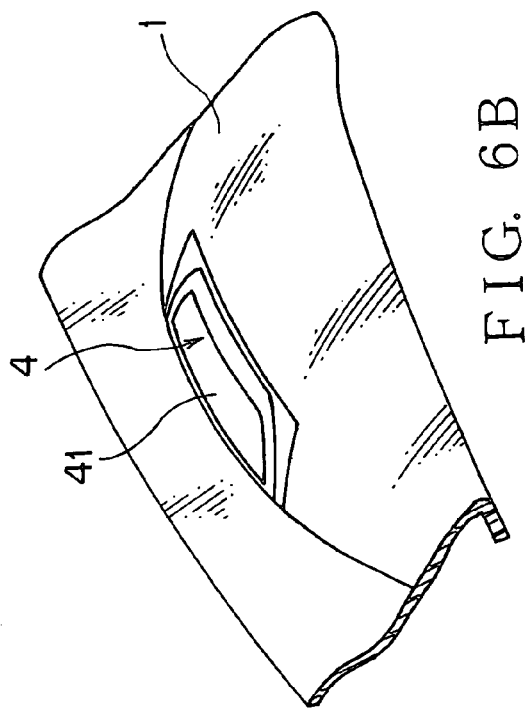

Further, in the first embodiment, the reflection mirror 4 is received under the instrument panel 1. However, the present invention is not limited to the above. For example, according to a later-described second embodiment, a part of the reflection mirror 4 may be projected outward from an opening of the instrument panel 1 as shown in FIGS. 6A and 6B.

Second Embodiment

A second embodiment of a head-up display apparatus 10 for a vehicle will be explained with reference to FIGS. 2, 6A, 6B, 7A, and 7B. In order to avoid repetitions, the same reference numerals are used for the same components, and only the differences existing in comparison with the related art and the first embodiment described above will be explained.

Figure 7A:
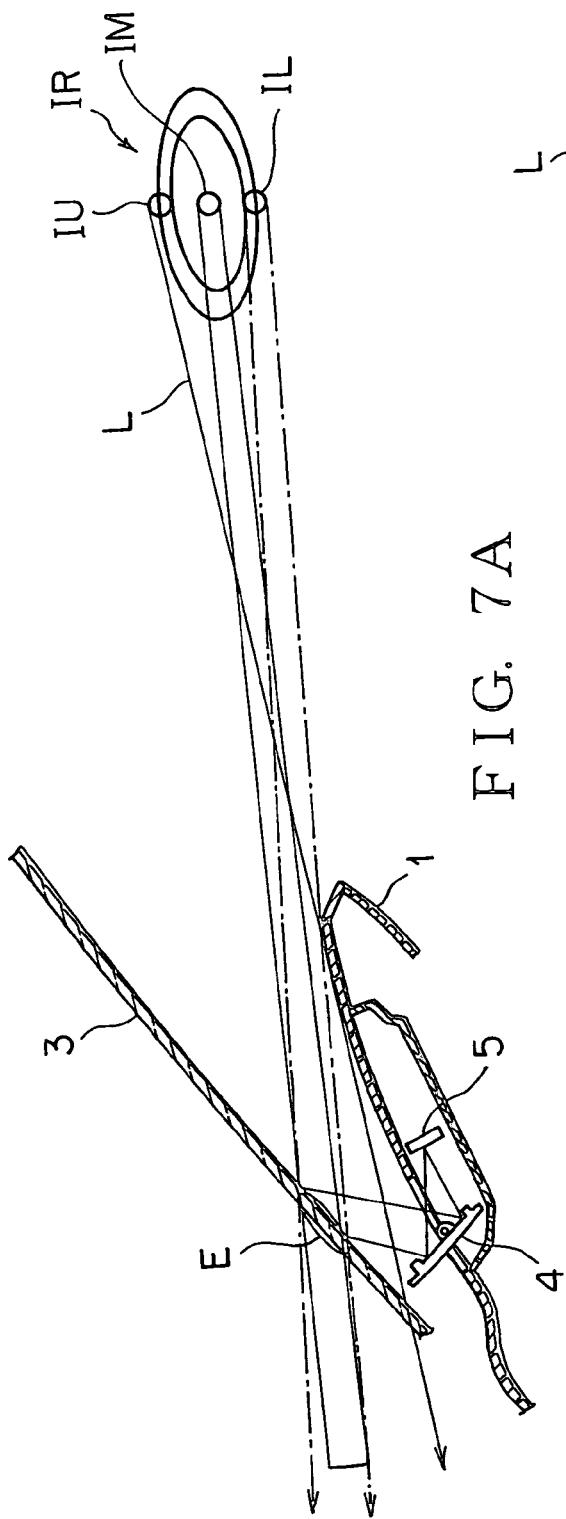
FIG. 7A is an explanatory sectional view showing a relation between a lower limit line and the eye range in a vehicle.
Figure 7B:
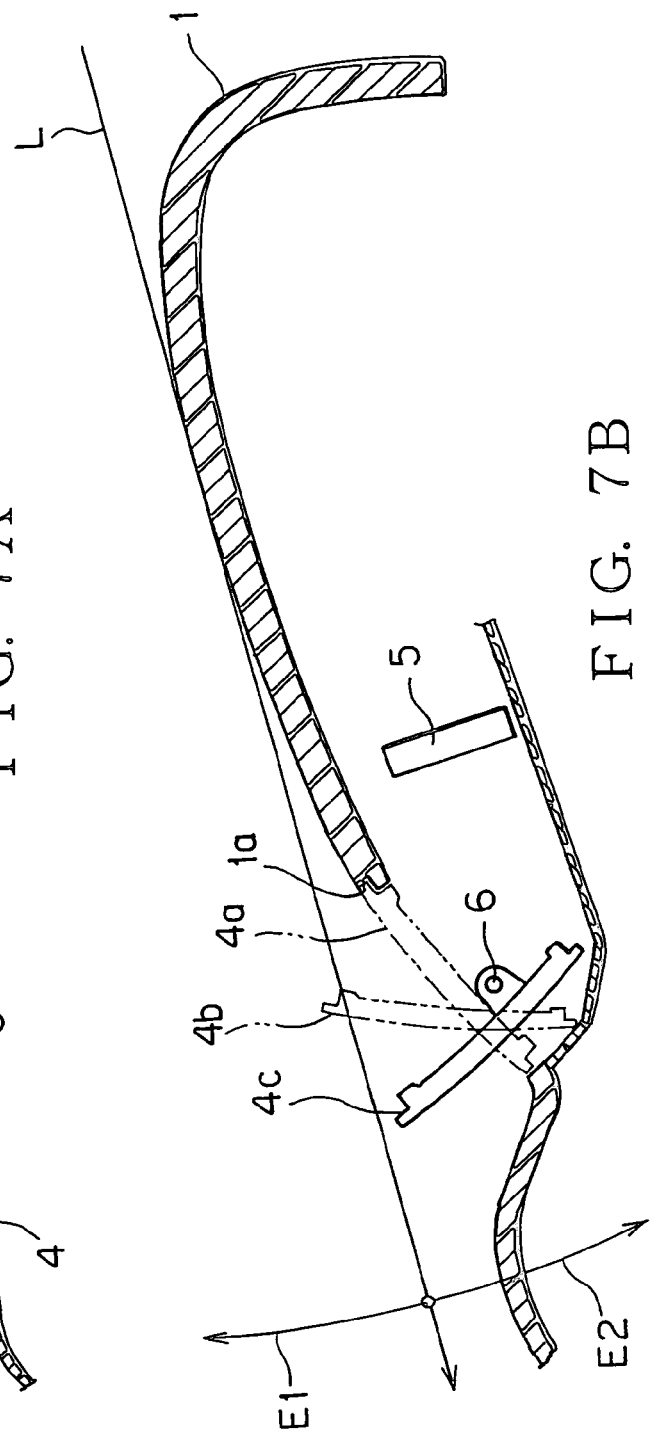
FIG. 7B is an explanatory sectional view showing a relation between a lower limit line and the reflection mirror.

FIG. 7A shows a lower limit line L extending from the eye point IU positioned on the upper limit of the eye range IR and touching a top surface of the instrument panel 1. As shown in FIG. 7B, in each vehicle type, an area over the lower limit line L is defined as an area E1 being visible directly from the eye range IR, while an area under the lower limit line L is defined as an area E2 being invisible directly from the eye range IR.

As shown in FIGS. 6B and 7B, a reflection mirror 4a arranged substantially horizontally is under the lower limit line L and is invisible from the eye range IR. The cover 41 disposed at the backside of the reflection mirror 4 a works as a cover of the instrument panel 1. When the head-up display apparatus 10 is not in use, the cover 41 covers the opening of the instrument panel 1, and the reflection mirror 4a is received under the instrument panel 1.

When starting using the head-up display apparatus 10, a top of the reflection mirror 4b is temporarily visible as shown in FIG. 7B When the substantially U-shaped frame 7 rotates the head-up display apparatus 10 at around the predetermined reflection angle, the reflection mirror 4c arranged vertically and the cover 41 are positioned under the lower limit line L and invisible from the eye range IR.

A moving range of the stopper 141 is so set as not to set the top of the reflection mirror 4 and the cover 41 over the lower limit line L at the reflecting angle. This moving range of the stopper 141 defines an adjustment range of the reflection mirror 4. A moving range of the frame 7 is so designed as to trace the predetermined moving route of the reflection mirror 4 as the above.

According to the above, the reflection mirror 4 can be disposed next to the instrument panel 1 in a vertical direction. Therefore, even when the reflection mirror 4 is enlarged, interfere of the reflection mirror 4 with other objects received under the instrument panel 1 can be prevented. Accordingly, the head-up display apparatus 10 can be small-sized.

According to the urging member 8 described above, the adjustment of the angle of the reflection mirror 4 is free from an effect of the rotation of the frame 7. Therefore, the angle adjustment mechanism for the reflection mirror 4 can be simplified. Further, because the stopper mechanism 14 is not integrated with the frame 7, the mirror unit may only include the reflection mirror 4 and the frame 7. Therefore, the mirror unit can be downsized and simplified.

Further, according to the second embodiment of the present invention, the stopper motor 142 is used as the angle adjustment mechanism, however, the angle adjustment system may be composed of an adjusting dial and a transmitting mechanism.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A head-up display apparatus comprising: a reflection mirror having an aspherical surface for compensating a distortion of a projected image caused by a non-planarity of a windshield; and a driving device for driving the reflection mirror to adjust projected light reflected at a reflecting point on the reflection mirror to a predetermined projecting point in a predetermined projection area on the windshield, said driving device being moved for pushing the reflection mirror to adjust the projected light reflected at the projection point to an eye point, from which a vehicle driver can see a forward view through the windshield and the projected image superimposed on the forward view, wherein
the driving device rotates the reflection mirror about a rotating shaft disposed separately from the reflection mirror to be separated a selected distance in front of a reflecting surface of the reflection mirror and facing the reflecting surface.

2. The head-up display apparatus as claimed in claim 1, wherein
the reflection mirror is retractable, and the driving device includes: a rotatable frame supporting the reflection mirror, and being rotatable together with the reflection mirror between positions where the reflecting mirror being arranged substantially vertically and horizontally; a stopper for stopping the rotation of the reflection mirror at a predetermined angle; and an adjusting member for moving the stopper for pushing the reflection mirror to adjust the angle of the reflection mirror.

3. The head-up display apparatus as claimed in claim 2, wherein
the driving device further includes an urging member constantly urging the reflection mirror in a direction of arranging the reflection mirror vertically for holding the rotating mirror with the stopper, the stopper pushing in the direction of arranging the reflection mirror horizontally to prevent movement of the reflection mirror in the direction of arranging the reflection mirror vertically by the urging of the urging member.

4. The head-up display apparatus as claimed in claim 2, wherein
the frame supports the reflection mirror in a manner that at least an upper part of the reflection mirror is temporarily projected outward from an instrument panel of the vehicle during retraction of the reflection mirror, and the stopper stops the rotation of the reflection mirror so as not to be seen from the eye range through an opening of the instrument panel when the head-up display apparatus is in use.

* * * * *